United States Patent [19]

Kalmus et al.

[11] Patent Number: 4,674,044

[45] Date of Patent: Jun. 16, 1987

[54] AUTOMATED SECURITIES TRADING SYSTEM

[75] Inventors: Leslie P. Kalmus, New York, N.Y.; Donald R. Trojan, Stamford, Conn.; Bradley Mott, Douglaston; John Strampfer, Greenlawn, both of N.Y.

[73] Assignee: Merrill Lynch, Pierce, Fenner & Smith, Inc., New York, N.Y.

[21] Appl. No.: 696,407

[22] Filed: Jan. 30, 1985

[51] Int. Cl.$^4$ .................... G06F 15/20; G06F 15/30
[52] U.S. Cl. .................... 364/408; 340/825.26; 340/825.27
[58] Field of Search .................... 364/408, 200, 900; 340/825.26, 825.27

[56] References Cited

U.S. PATENT DOCUMENTS

| | | | |
|---|---|---|---|
| 2,046,381 | 7/1936 | Hicks | 340/825.27 |
| 3,082,402 | 3/1963 | Scantlin | 340/825.27 |
| 3,296,597 | 6/1967 | Scantlin | 340/825.27 |
| 3,387,268 | 6/1968 | Epstein | 340/825.27 |
| 3,573,747 | 4/1971 | Adams | 340/825.27 |
| 3,716,835 | 2/1973 | Weinberg | 340/825.27 |
| 4,334,270 | 6/1982 | Towers | 364/408 |
| 4,412,287 | 10/1983 | Braddock | 364/408 |
| 4,473,824 | 9/1984 | Claytor | 340/792 |
| 4,554,418 | 11/1985 | Toy | 364/900 |

Primary Examiner—Jerry Smith
Assistant Examiner—G. Hayes
Attorney, Agent, or Firm—William L. Botjer

[57] ABSTRACT

Data processing based apparatus makes an automated trading market for one or more securities. The system retrieves the best obtaining bid and asked prices from a remote data base, covering the ensemble of institutions or others making a market for the relevant securities. Data characterizing each securities buy/sell order requested by a customer is supplied to the system. The order is qualified for execution by comparing its specifics against predetermined stored parameters. The stored parameters include the operative bid and asked prices, the amount of stock available for customer purchase or sale, and maximum single order size.

Once qualified, the order is executed and the appropriate parameters are updated. The system provides inventory (position) control and profit accounting for the market maker. Finally, the system reports the executed trade details to the customer, and to national stock price reporting systems. Upon a change in the quoted price for a security, the system updates all relevant qualification parameters.

10 Claims, 6 Drawing Figures

ORDER EXECUTION

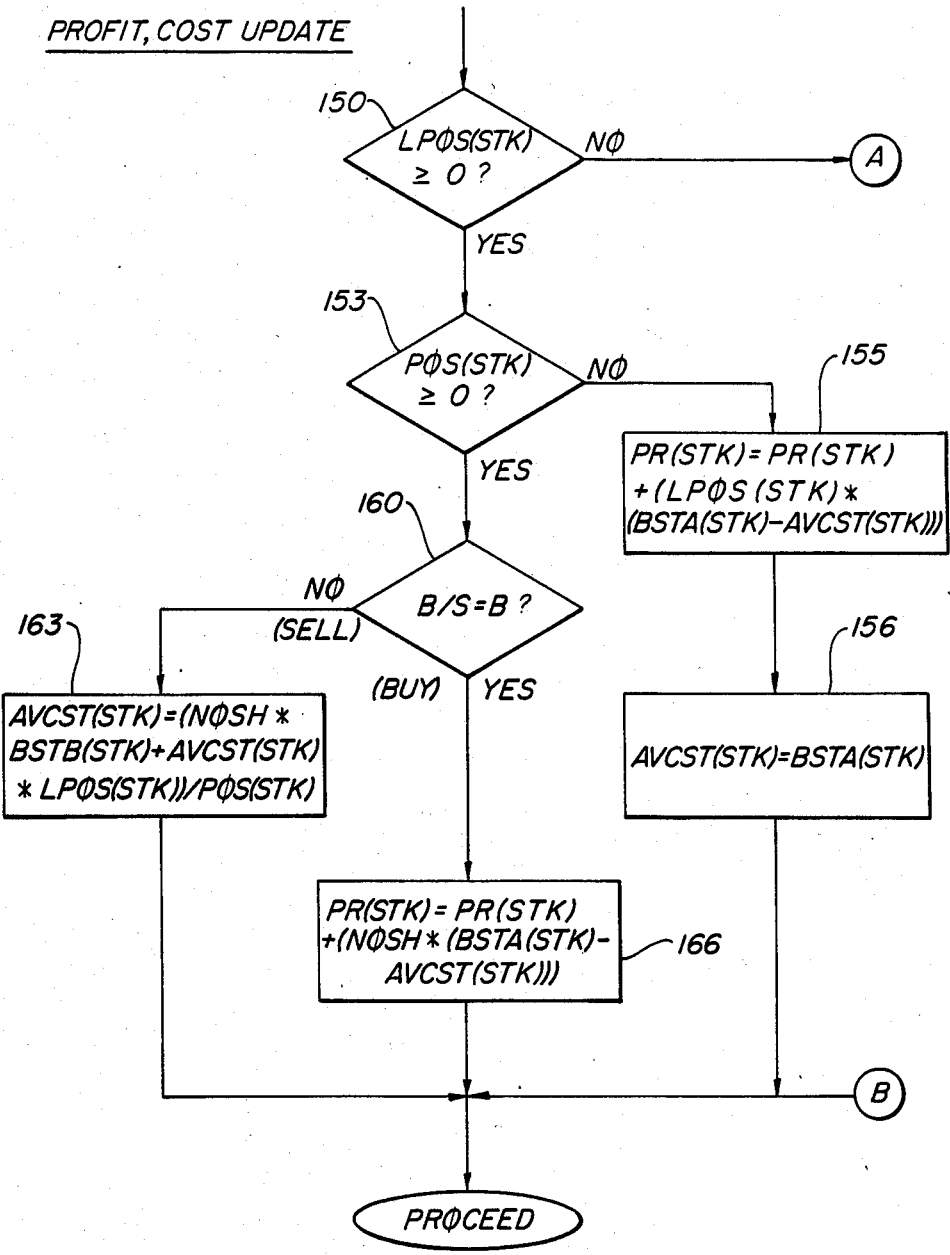

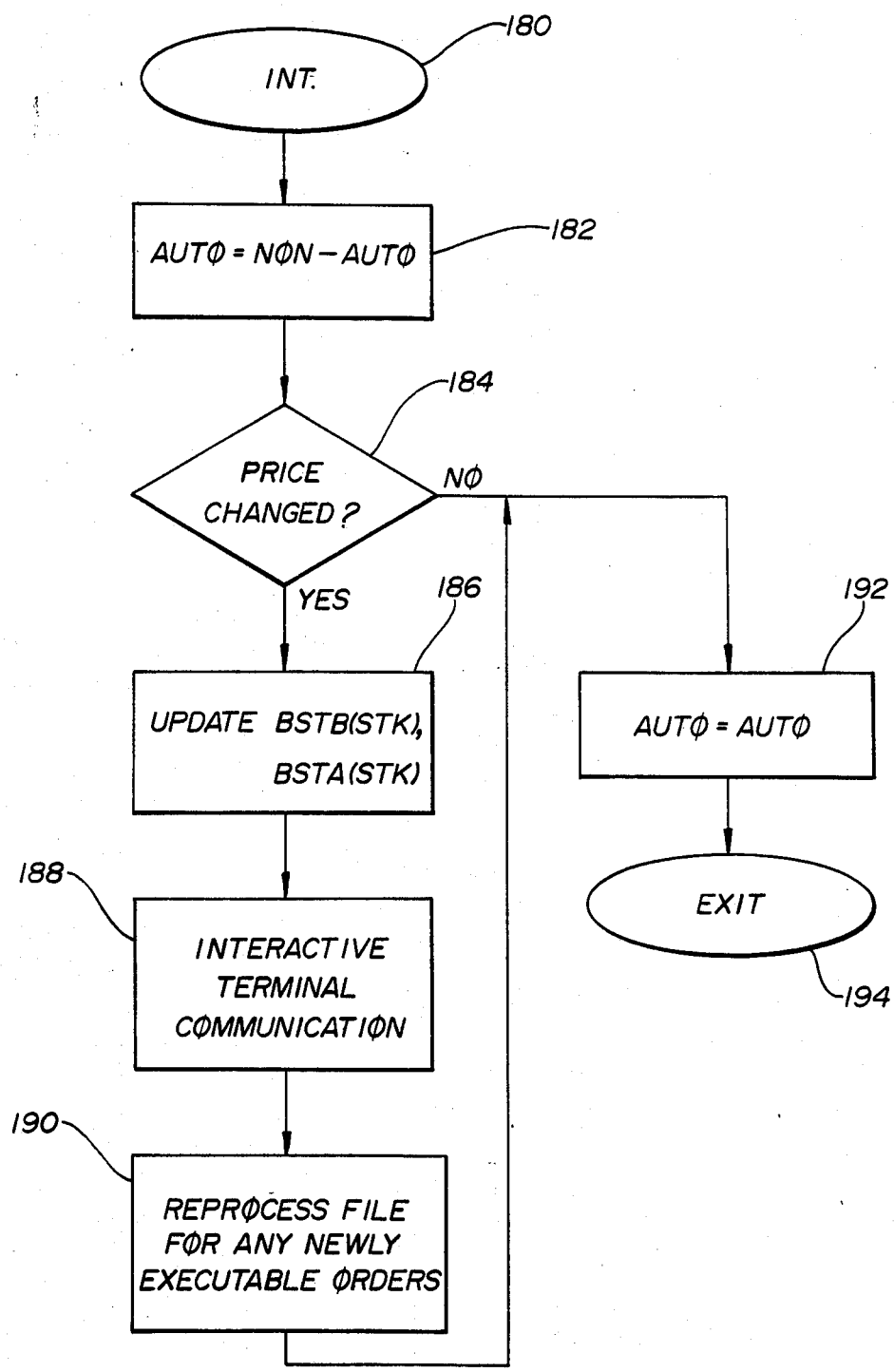

AUTOMATED SECURITIES TRADING SYSTEM

BACKGROUND AND SUMMARY OF THE INVENTION

This invention relates to business systems and, more specifically, to an improved data processing based system for implementing an automated trading market for one or more securities. The system retrieves and stores the best current bid and asked prices; qualifies customer buy/sell orders for execution; executes the orders; and reports the trade particulars to customers and to national stock price reporting systems. The system apparatus also determines and monitors stock inventory and profit for the market maker.

There are various modes of buying or selling ("trading") securities, e.g., common stocks. Aside from interparty private transactions, stock trading is typically effected on a national or regional exchange, or in what is known as the over the counter ("OTC") market. For either exchange or over the counter trading, there is one or more market maker (called a "specialist" for an exchange) who accommodate the trading wishes of buyers and sellers of securities for which they make a market.

The principles of the present invention are generically applicable to securities trading in any market where the market maker acts as a principal, i.e., fills customer buy orders by selling the security from the market maker's inventory position (long or short), buying to increase a long position or reduce a short position for customer sell orders. For purposes of illustration only, the discussion herein will treat over the counter trading as a discussion vehicle because the largest number of common stocks are traded on this basis; and because major brokerage houses are free to and often do make markets in selected over the counter traded stocks but are restricted in their ability to make a market for stocks listed on an exchange(s) by exchange rules.

It is an object of the present invention to provide an improved data processing apparatus for making an automated market for one or more securities.

More specifically, it is an object of the present invention to provide an automated market making system for qualifying and executing orders for securities transactions.

It is a further object of the present invention to provide automated market making program controlled apparatus which monitors the securities position of the market maker, and which develops and provides information characterizing the market maker's trading profits.

The above and other objects of the present invention are realized in specific, illustrative data processing based apparatus which makes an automated trading market for one or more securities. The system retrieves the best obtaining bid and asked prices from a remote data base covering the ensemble of institutions or others making a market for the relevant securities. Data characterizing each security buy/sell order requested by a customer is supplied to the system. The order is qualified for execution by comparing its specific content fields with predetermined stored parameters. The stored parameters include such as the operative bid and asked current market prices, the amount of stock available for customer purchase or sale as appropriate, and the maximum acceptable single order size.

Once qualified, the order is executed and the appropriate stored parameters are updated. The system provides inventory (position) control and profit accounting for the market maker. Finally, the system reports the executed trade details to the customer, and to national stock price reporting systems. Upon a change in the quoted price for a security, the system updates all relevant order qualification parameters.

BRIEF DESCRIPTION OF THE DRAWINGS

The above and other features and advantages of the present invention will become apparent from the discussion hereinbelow of a specific, illustrative embodiment thereof presented in conjunction with the accompanying drawings, in which:

FIGS. 4 and 4A are flow charts illustrating data processing for inventory and profit updating; and FIG. 5 is a flow chart of data processing upon a change in insider market price of a security.

DESCRIPTION OF THE PREFERRED EMBODIMENTS

Figure 1:
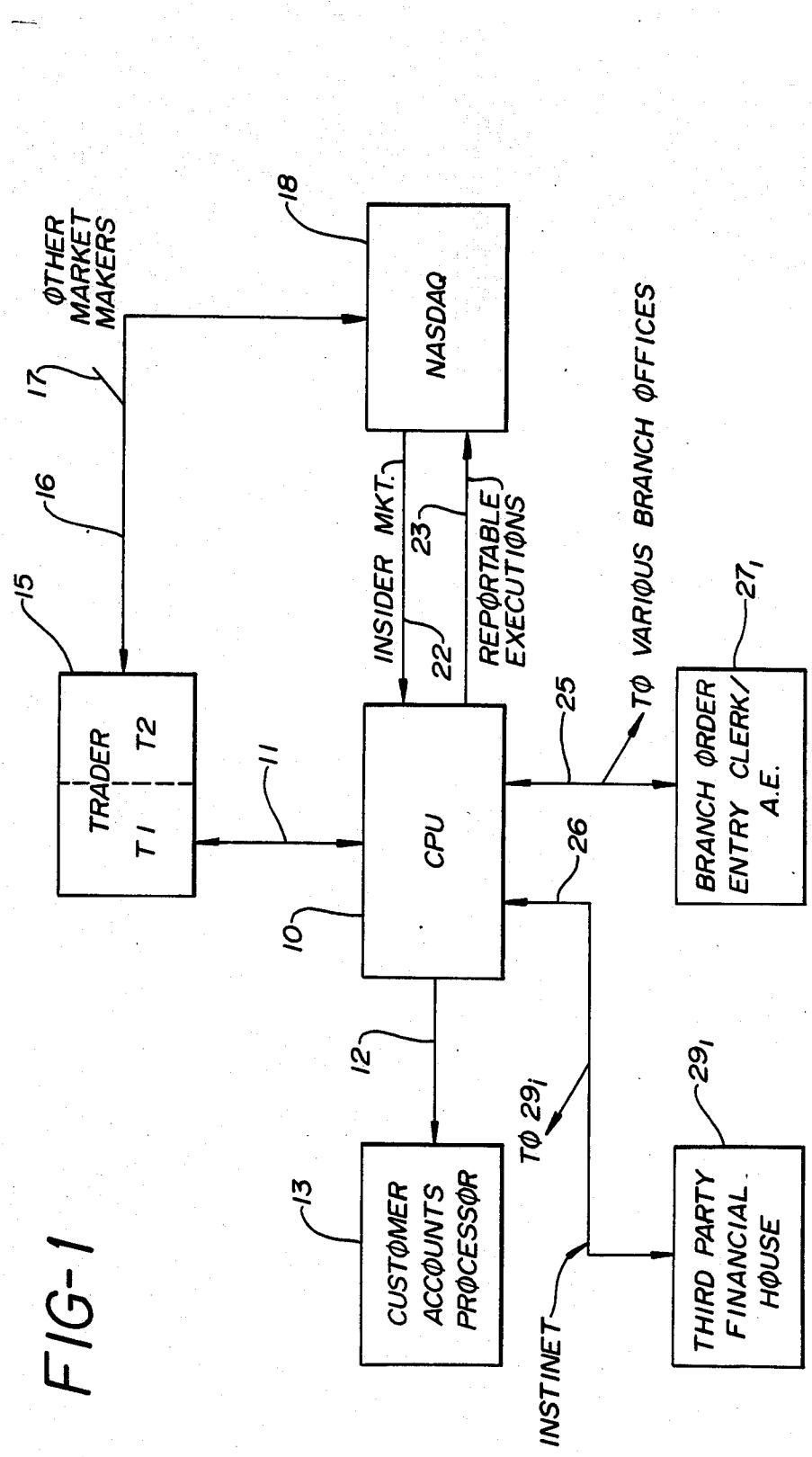
FIG. 1 is a block diagram of the system for effecting the securities trading of the present invention.

As used herein, the terms "buy" and "sell" refer to customer purchases and sales. It should be noted that when a customer purchases stock, the market maker sells stock from its position, either reducing a long position, increasing a short position, or both where the number of shares sold to the customer exceeds the initial long position. When a customer sells stocks, the market maker adds stock to its position and/or reduces a short position in the security.

The system may be implemented by any digital data processing equipment per se well known to those skilled in the art, e.g., any common bus system interconnecting a digital processor, manual data entry terminal apparatus, one or more memories (one of which contains the controlling program), and output signalling apparatus such as a cathode ray tube and printer. The system may be coded in any program language per se well known to those skilled in the art. The process variables may be of any form which conform to the constraints of the particular language being used and the below listed variables are for purposes of illustration only.

In the operation of an illustrative system, the below listed process variables may be utilized:

| Variable | Functional Description |
|---|---|
| Order Variable | |
| STK | An order field identifying a particular stock a customer wishes to buy or sell. |
| NØSH | Number of shares of stock STK in a transaction. |
| CUSTID | Customer identification. |
| B/S | Buy vis-a-vis sell bit, identifying whether the customer wishes to buy or sell security STK |
| PR/M | An order variable field containing a customer price for a limit order (minimum price for a sale of securities or a maximum price he will pay for a purchase) - or a code |

| Variable | Functional Description |
|---|---|
| | -continued |
| | designating a market order where the customer will accept the currently prevailing market price. |
| SP | Special instructions field (e.g., special commission structure or the like). |
| ØRN | Order number (usually sequential). |
| ØRIGID | Identification of the originator of the transaction (e.g., a branch office or account executive). |
| Market Trade Criteria | |
| BSTB(STK) | Best bid price for the stock STK as retrieved from NASDAQ, i.e., the highest price some market maker is willing to pay for the stock. This is an indexed variable, or array, having one element for each security handled by the system proprietor. The other arrays below are similarly indexed by STK. |
| BSTA(STK) | Best asked price for the stock STK supplied by NASDAQ, i.e., the lowest price a market maker is willing to sell the stock STK. |
| BSZ(STK) | Buy size, which is the number of shares of each stock (the array index STK) available for customer purchase at a particular price from the system proprietor |
| SSZ(STK) | The number of shares of each stock STK that the market maker will accept from customer sales at a particular price (a sell size array). |
| ØRSZ(STK) | The maximum acceptable order size which the system operator will accept for the stock STK. |
| Profitability Variables | |
| AVCST(STK) | Average cost of the stock STK. |
| PØS(STK) | The amount of shares (current position) of each stock STK held by the market maker. PØS(STK) is positive for a long position and negative for a short position. |
| LPØS(STK) | The previous (last) position of the market maker in the stock STK before execution of a current trade in STK. |
| PR(STK) | Profit to date made by the system operator on purchases or sales of stock STK. |

Turning now to the drawing, FIG. 1 illustrates in overview a system arrangement for implementing the over the counter (or other) stock market making system of the instant invention. For specificity and without limitation, over the counter stock trading is presumed and it will further be assumed that the market making institution (system proprietor) is a brokerage firm. The market making system includes composite digital computing apparatus 10 which includes a processor and ancillary memory. The memory constituents of processor 10 store the system controlling program, and an appropriate scratch pad memory stores all necessary processing operands. Digital computer 10 is connected by an output line 12 to a customer account processor 13, for example the brokerage firm computer which handles all of the customer account records and files including customer balances, securities positions, trade records, and the like. It should be understood that CPU 10 and customer account processor 13 could be combined in single, integrated computing equipment.

The processor 10 communicates over a link 11 with a trader terminal position 15 containing an output signalling device such as a cathode ray tube display, and data input apparatus such as a keyboard. Trader terminal 15 has two portions. A terminal position section T1 communicates with the processor 10; and a section T2 is connected by link 16 to the National Association of Securities Dealers Automated Quotation (NASDAQ) system 18. The trader terminal 15 communicates its current bid and asked prices for stocks in which it makes a market to NASDAQ via link 16—as do other market makers bridged (17) to link 16. The terminal portions T1 and T2 may be one integrated smart terminal (computer) assembly, or two separate devices available to the trader at the station 15.

The processor 10 receives and stores the best (highest) bid (processing variable BSTB(STK)) for each stock (STK) in which it makes a market, and the best (lowest) asked price BSTA(STK) from the NASDAQ system 18 via a communications path 22. The best bid and best asked prices as reported by NASDAQ form the so-called "insider market" for over the counter securities. Processor 10 communicates to the NASDAQ system 18 via a link 23 each reportable, executed trade for various informational and regulatory purposes. Link 23 also reports trades to the Consolidated Tape Authority (CTA) and the NASD National Market System (NMS) for subsequent reporting to the financial industry and general public. Communications path 23 also connects processor 10 with the NASD small order execution system (SOES) and computer assisted execution system (CAES) which can participate in relatively small order execution.

Input/output network 25 provides data communication with the various branch offices 27 of the brokerage house. Line 25 permits communication with either the branch order entry clerk or directly to the account executives at each branch. While only one branch $27_1$ is shown in FIG. 1, it is to be understood that a multiplicity of branches $27_i$ are in data communication with processor 10. Computer 10 also communicates with third party financial houses $29_i$ via a two-way data link 26 (e.g., including INSTINET).

To characterize the FIG. 1 arrangement in overview, the operative (best bid, best asked inside market) prices for each stock in which the system proprietor makes a market are communicated over link 22 from NASDAQ and repose in memory at processor 10. The market maker has a position in each security in which he makes a market and the particulars of that position also repose in memory within the composite processor 10. Orders for trades in the relevant securities are funneled to the processor 10 in real time as they occur. Orders can be received in several ways. For example and most typically, orders may be generated by the brokerage firm's account executives at the branches 27 and communicated to the CPU 10 via the communication path 25. Orders are also supplied to the processor 10 from third party financial sources 29 (e.g., other brokerage firms, directly from computer equipped customers, banks or the like) over communication network 26. Each of the orders includes appropriate data fields outlined above and more fully discussed below, such as an identification of the office and customer or other originator of order, stock identification, price particulars and so forth.

The processor 10 first determines whether or not each received order can be executed, i.e., "qualifies" the order. There are various reasons why an order will not be executed by the market maker. Thus, for example, the customer may seek to sell stock above the current bid price or to purchase the security below the current asked price. A customer may seek to trade a number of shares which exceeds the amount which the particular market maker is willing to accommodate, either in gross or for any one order. Orders not executable, i.e., orders not qualified, are either stored in memory in the processor 10 for later execution if they become qualified (such as by a favorable change in the market price for a security which can then accommodate the customer's price limits) or are forwarded to other market makers for potential execution over communication links 23 or 26.

Assuming that an order is executable, the processor 10 "executes" the order, appropriately adjusting all balances. Information characterizing the executed order is sent to computer 13 for customers of that brokerage house or reported to the appropriate other institution via links 23 or 26. The specifics of appropriate transactions are also reported to the NASD for informational purposes and to the Consolidated Tape Authority and so forth and may become stock ticker entries.

The NASDAQ system 18 is apprised of the current quotations from all traders making a market in the subject securities via communication path 16. The insider market (best bid and asked prices) are communicated to the market maker's processor 10 via link 22. When the insider market price changes (a variation in the best bid or best asked price), the processor 10 in accordance with the instant invention signals the trader at station 15 who is then given the opportunity to readjust his quantity or other market-characterizing criteria. Following each price change, all non-executable orders stored in the processor 10 memory are reviewed to determine whether they have become executable and, if so, they are in fact executed. Processing then continues as above described to accommodate the real time order inflow.

Figure 2:
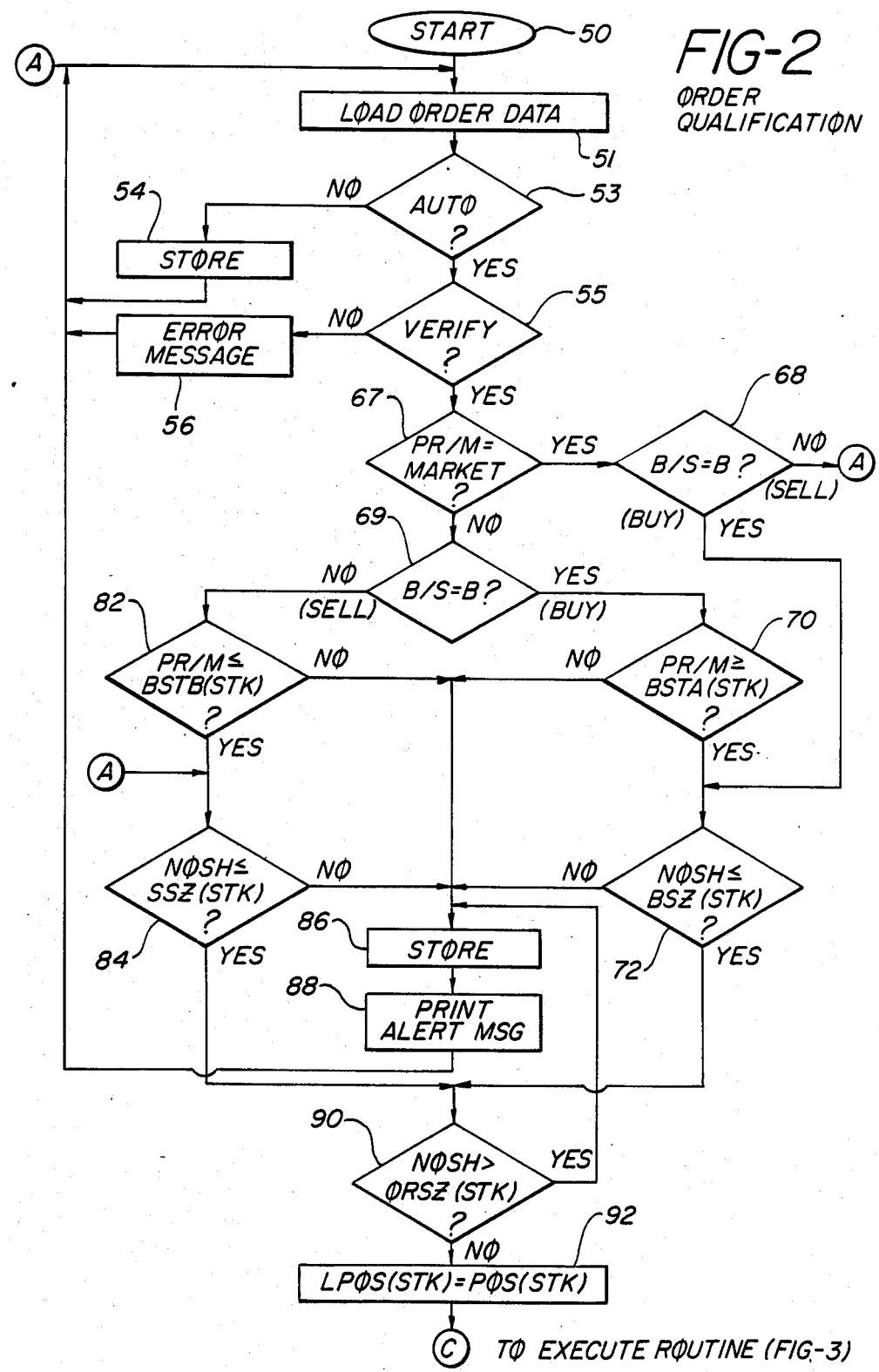
FIG. 2 is a flow chart illustrating data processing for qualifying an order for execution.

With the above overview in mind, attention is now directed to FIG. 2 which is a flow chart of data processing for qualifying for execution an order communicated from a branch order entry clerk or account executive $27_i$. Proceeding from a start node 50, the data fields comprising this next-recorded order is loaded (block 51). The order data fields include the name of the stock (STK); the number of shares for the transaction (NØSH); customer identification (CUSTID); a buy vis-a-vis sell bit (B/S); the customer's price limit if he wants one or, if not, a market order designator (PR/M); special instructions if any (SP); an order number (ØRN); and an originator (e.g., office, account executive, or third party institution) identification (ØRIGID).

The computer includes a number of stored variables characterizing the market for the stock STK which the customer wishes to trade, and the market maker's own criteria for his participation in STK trading. Thus, for example, the computer stores the best bid BSTB(STK); the best asked price BSTA(STK); the buy size BSZ(STK), i.e., the total amount of shares of STK the market maker is willing to sell for customer purchase at the current price; the market maker's sell size SSZ(STK); the maximum single order size for stock STK which the market maker will accept ØRSZ(STK); the present number of shares of stock STK long or short in the market maker's position PØS(STK)—long being positive and short being negative; the average per share cost AVCST(STK) for the stock STK long or short in the market maker's portfolio; and a running profit total PR(STK) of the market maker in the stock STK. Block 53 functioning next determines if order processing is operative in the normal, automated market mode for the particular stock STK. If not (please see below with respect to FIG. 5), program flow branches to block 54 to store the order for later retrieval or manual execution. Program flow then returns to start node 50 for retrieval of the next order. Assuming normal automated mode processing (YES output of test 53), program flow continues to test 55 to verify the incoming data (order) to assure correct reception and internal consistency. If an error occurred, an error message is produced (block 56) and program flow returns to the start node 50 for entry of the incoming next order. In the usual case, the order is verified at test 55, and program flow continues to block 67 to determine if the order is a market order or has a limit price (test of the PR/M variable).

If the order is not a market order but rather is to be executed at or better than a customer specified price (NØ branch from test 67), program flow proceeds to block 69 which distinguishes a customer buy (B/S=B) from a sell order (B/S=S). If it is a buy order (YES, (BUY) branch from test 69), block 70 determines if the price at which the order is to be executed (contents of PR/M) is greater than or equal to the prevailing asked price (BSTA(STK)) of the stock. If the purchase price of the order to be executed is greater than the best asked price (YES branch of test 70), block 72 determines if the number of shares NØSH in the trade is less than or equal to the shares available for purchase from the market maker, i.e., less than the buy size BSZ(STK). If so (YES branch of test 72), the number of shares NØSH in the transaction is compared to the maximum acceptable single order size ØRSZ(STK)—step 90. Assuming this final criteria is satisfied (NØ exit), the order is qualified for execution, and program flow continues to block 92 where a variable storing the last position in stock STK, LPØS(STK) is set equal to PØS(STK). The program thereafter proceeds to order execution as detailed in FIG. 3 and discussed below.

If the price or buy size tests performed at blocks 70 and 72 fail (NØ branch), or if the order size test performed at block 90 indicates the order is too large (YES branch), the order is not qualified for and will not be executed. When any of these conditions obtain, program flow branches to block 86 to store the order for possible later execution if market conditions or market maker criteria change. An appropriate report is generated at block 88 via terminal 15 (FIG. 1) to characterize non-executed order. Thereafter program flow returns to node 50 to process the next received order. The human market system controller receiving the report may of course over-ride and complete the trade by hand or manual entry—e.g., by authorizing more stock (increasing BSZ(STK)) if that criterion inhibited order execution.

The foregoing analysis has considered a limit buy order. Returning now to block 69, program flow for a customer sale will next be considered. If the buy/sell flag signals a sale, program flow branches to block 82 where the PR/M limit price is compared to the best bid price (PR/M≦BSTB(STK)). If so (YES branch), the number of shares NØSH in the order is compared against the available sell size (NØSH≦SSZ(STK)). If there are sufficient shares in the sell size (YES branch), block 90 determines if the number of shares (NØSH) is greater than the maximum permissible single order size (ØRSZ(STK)). If the number of shares NØSH does not exceed ØRSZ(STK) all criteria are satisfied and the sell order will be executed. Processing proceeds to block 92 where the "last" position intermediate processing variable LPØS(STK) is set equal to PØS(STK), and order execution proceeds as set forth in FIG. 3. If any price or sell size test performed at blocks 82, or 90 fails, program flow branches to block 86 for storage and reporting (block 88).

The above description details order qualification for a limit price transaction. In a trade that is to be executed at market, the price tests performed at block 70 for a buy and block 82 for a sale are by-passed. Accordingly, when block 67 determines that the order is to be executed at market (PR/M=market), block 68 is reached and branches the program to size test 84 for a customer sale and test 72 for a customer purchase. The system then operates in the manner above described, qualifying the order for execution if the two operative size criteria are satisfied or, otherwise, storing the order and reporting (step 88).

Figure 3:
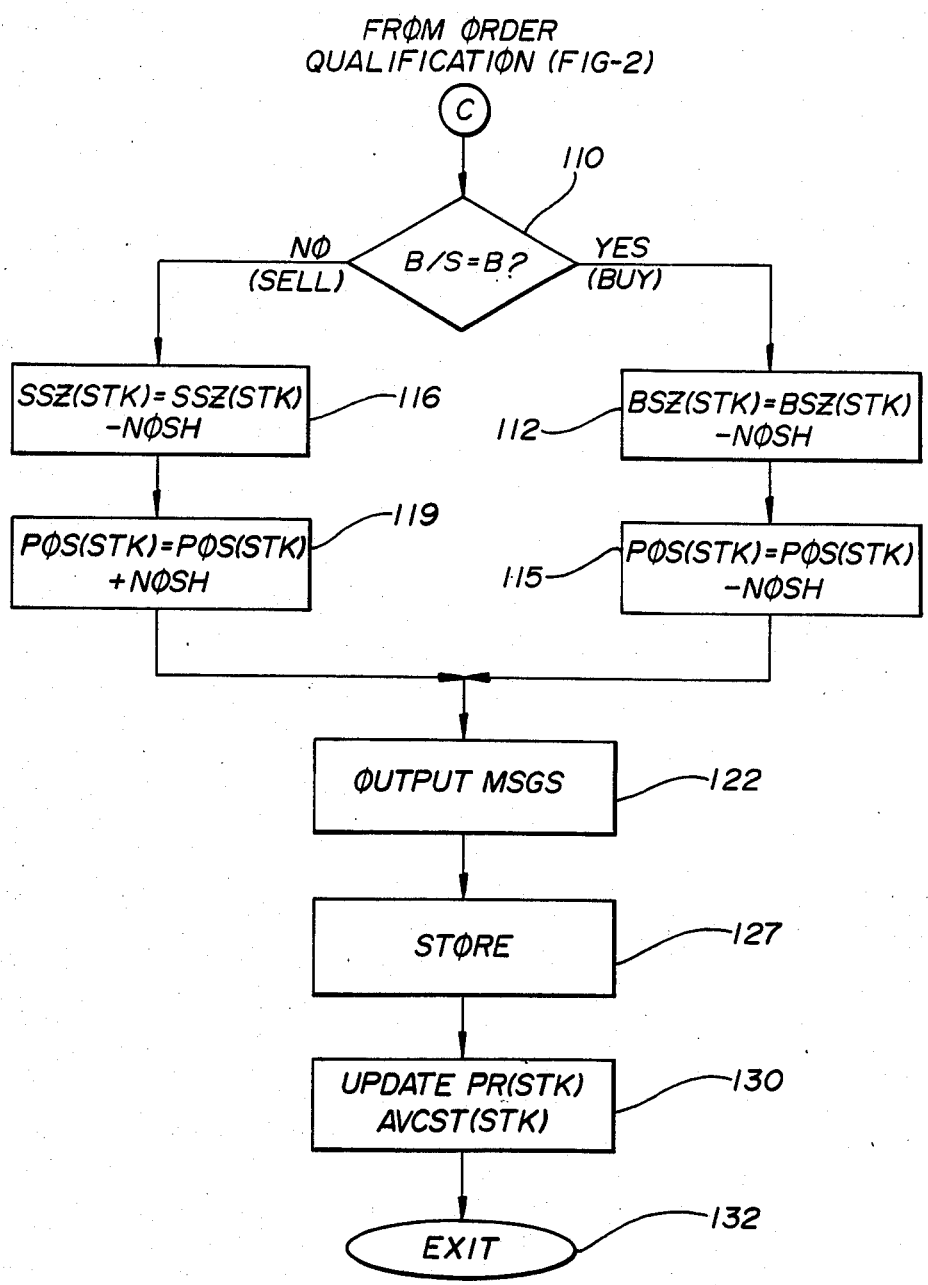
FIG. 3 is a flow chart illustrating data processing for order execution and accounting.

FIG. 3 illustrates data processing for executing and accounting for orders that have been qualified for execution by the order qualifying data processing of FIG. 2. A block 110 determines whether the order is a customer purchase or sale. If the buy/sell digit signals indicate a customer buy, program flow branches to block 112 for decrementing the amount of shares remaining available for customer purchase (BSZ(STK)) from the market maker. BSZ(STK) is decremented by the number of shares of the stock (NØSH) purchased by the customer, i.e., BSZ(STK)=BSZ(STK)−NØSH. The market maker's position in the stock is algebraically decremented by the number of shares purchased, PØS(STK)=PØS(STK)−NØSH (step 115). If at block 110 it is determined that the order is a sell, block 116 decrements sell size SSZ(STK) by the number of shares sold to the customer, SSZ(STK)=SSZ(STK)−NØSH. The market maker's position PØS(STK) in the stock is updated by algebraically incrementing the number of shares sold by the customer, PØS(STK)=PØS(STK)+NØSH (step 119).

After the position PØS(STK), buy size BSZ(STK), and sell size SSZ(STK) variables have been updated, program flow continues to block 122 where messages confirming execution of the trade are furnished to the customer account processor 13 which sends out confirmations of the transaction and otherwise performs the necessary accounting functions for the customer account. The branch clerk or account executive 27$_i$ is also notified of order execution via link 25. The order variables CUSTID, SP, ØRN and ØRIGID are used to appropriately distribute trade reporting, proper commission computation and the like. Further, the transaction price is typically communicated to the NASDAQ system 18 and the various tape services for reporting. The updated internal market maker variables (e.g., SSZ(STK), BSZ(STK), LPØS(STK), PØS(STK)) are stored in memory for use in subsequent order transactions (step 127). Program flow proceeds to block 130 to update the market maker's average per share inventory cost AVCST(STK) and profit PR(STK) internal management variables for the stock STK, the data processing for which is described below in conjunction with FIGS. 4 and 4A. After inventory updating and profit accounting, data processing exits at node 132 ready to process the next trade.

Figure 4A:
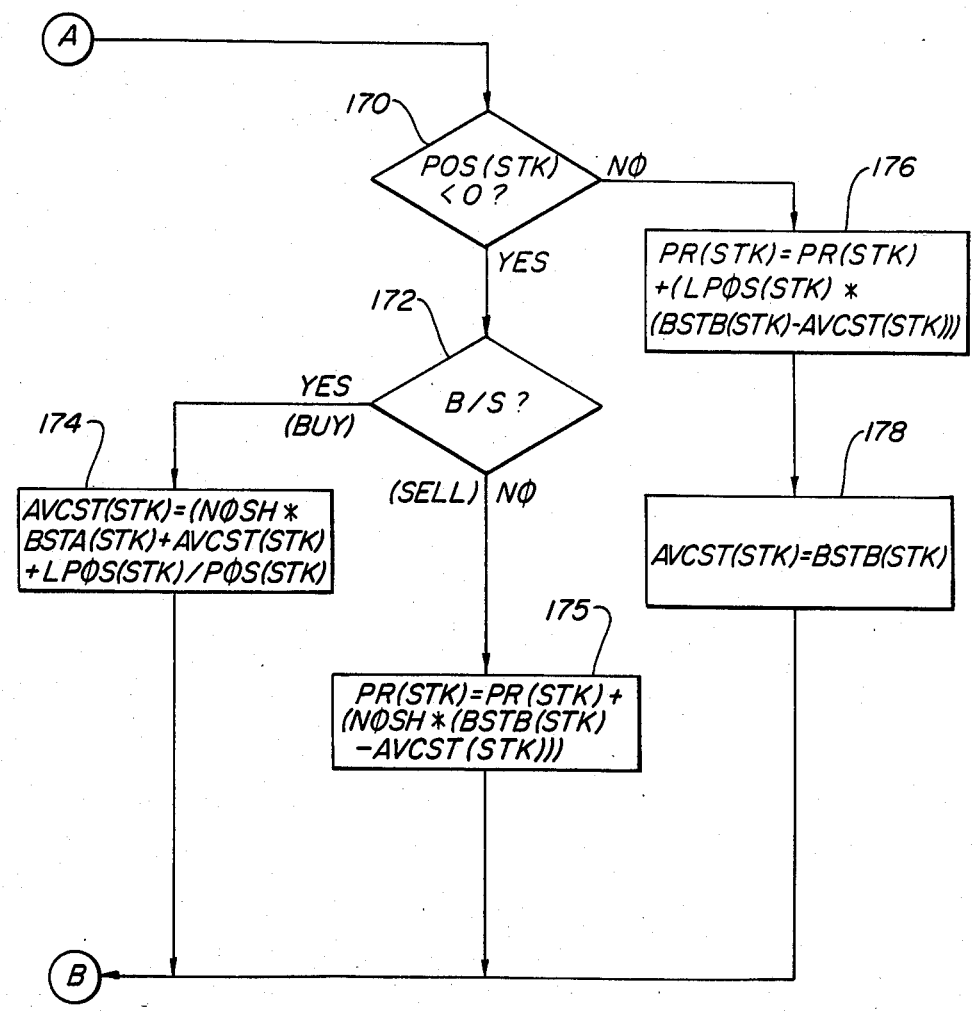

FIGS. 4 and 4A are the left and right portions of a flow chart for the data processing of block 130 (FIG. 3) for updating the inventory cost (average share price AVCST(STK)) of the stock STK and the running profit PR(STK) realized from the execution of each trade. To this end, the last position of the market maker LPØS(STK) before the just executed trade is tested to determine whether the market maker was previously long or short in the stock STK (step 154). If LPØS(STK)≧0 then the market maker's previous position was long and program flow proceeds to block 153 where the present (post trade) position of the market maker PØS(STK) is tested to determine if it is long (PØS(STK)≧0?=YES) or short (NØ). If the market maker's present position is short (NØ branch), the transaction was a branches to block 155 to update profit PR(STK) for stock STK, as by:

$$PR(STK) = PR(STK) + (LPØS(STK) * (BSTA(STK) - AVCST(STK))). \qquad \text{Eq. 1.}$$

In the right side of the programming statement of Equation 1, the variable BSTA(STK)−AVCST(STK) is the profit (or loss) margin on the sale representing the difference between the current asked price BSTA(STK) at which the trade occurred and the average per share cost AVCST(STK) of the stock. When multiplied by the number of shares previously in the long position (LPØS(STK)), the right factor following the plus sign in the statement of Equation 1 is the profit (or loss) for the transaction. When added to the previous running profit total PR(STK), the final result stored in PR(STK) is an updated running total of the profit of the market maker in the stock STK since the PR(STK) storage array element was last cleared.

Thereafter for the assumed event, program flow proceeds to block 156 where the average per share cost of the new short position in the stock is calculated. In this instance, the average cost of the stock is equal to the operative asked price, i.e., AVCST(STK)=BSTA(STK). FIG. 4 programming then exits at the PRØCEED node.

If at block 153 the market maker's present position is long (PØS(STK)≧0?=YES), program flow continues to test 160 where the buy/sell digit determines whether the transaction is a customer purchase or sale. If the trade is a customer sale thus increasing the initially long LPOS(STK) position, it is an inventory transaction and program flow branches to block 163 to update the average cost of the STK stock position:

$$AVCST(STK) = ((NØSH*BSTB(STK)) + (AVCST(STK)*LPØS(STK)))/PØS(STK). \qquad \text{Eq. 2.}$$

In the statement of Equation 2, NØSH*BSTB(STK) is the cost of the shares just purchased from the customer and AVCST(STK)*LPØS(STK) is the cost of the previous LPØS(STK) inventory. Thus, by dividing the sum of the new and former purchases by the number of shares held PØS(STK) the new average cost AVCST(STK) is determined.

If at block 160 the transaction was determined to be a customer purchase (market maker sale), program flow proceeds to block 166 where the market maker's profit is updated:

$$PR(STK) = PR(STK) + (N\emptyset SH*(BSTA(STK) - AVCST(STK))). \quad \text{Eq. 3.}$$

The above FIG. 4 processing has reviewed the three possibilities beginning with a long (positive) market maker stock position entering a transaction as signalled by the contents of LPØS(STK). Comparable functioning obtains if the contents of LPØS(STK) in test 150 are negative, signalling an initial short position (NØ output of test 150). Assuming such an initial short position, program flow passes to that shown in FIG. 4A which is the analog of that shown in FIG. 4.

In brief, a test 170 of FIG. 4A determines whether the present position PØS(STK) is short or long. If the present position is also short (PØS(STK)<0), program flow proceeds to block 172 where the buy/sell bit is read. If the buy/sell digit indicates a customer buy, the transaction represents an inventory accumulation (the previous short position in LPØS(STK) being increased in PØS(STK)) and program flow branches ("YES") to block 174 where the average cost of the stock is updated:

$$AVCST(STK) = ((N\emptyset SH*BSTA(STK)) + (AVCST(STK)*LP\emptyset S(STK)))/P\emptyset S(STK). \quad \text{Eq. 4.}$$

If at block 172 the transaction is determined a sell, block 175 updates the profit total:

$$PR(STK) = PR(STK) + (N\emptyset SH*(BSTB(STK) - AVCST(STK))). \quad \text{Eq. 5.}$$

As a final possibility in FIG. 4A, if at block 170 the market maker's present position is long (PØS(STK)<0?=NØ), the transaction was necessarily a customer sale (market maker purchase), and program flow branches to block 176 where the profit PR(STK) is updated:

$$PR(STK) = PR(STK) + (LP\emptyset S(STK)*(BSTB(STK) - AVCST(STK))). \quad \text{Eq. 6.}$$

The average share cost of the new PØS(STK) short position is the best bid (transaction) price (AVCST=BSTB(STK))—block 1786. This concludes the profit and cost updating for the transaction.

In most instances, more than one institution makes a market in a particular stock. Any market maker may change its bid or asked price at any time, transmitting the change to the NASDAQ system via link 16 as above discussed. In such an instance, it may be necessary to update the market maker's own prices—as where the change affects the insider market (best current bid and asked) to afford the customer execution at the best prevailing price. FIG. 5 is a flow chart illustrating data processing upon receipt of a new market maker quotation from the NASDAQ system 18. Beginning at an interrupt entry node 180, the system is placed in non-automatic execution mode (step 182) which prevents automatic execution of any orders in the particular stock (STK) until the market maker has had a chance to respond to the new market prices. If at block 184 it is determined that the best bid BSTB(STK) or best asked BSTA(STK) price has changed, program flow proceeds to block 186 where the best bid BSTB(STK) and/or best asked price BSTA(STK) are updated to the new values received from NASDAQ.

The system then interactively communicates with the trader terminal 15. A prompt appears on trader T1 terminal 15 requesting input regarding possible changes in the maximum acceptable order size (ØRS(STK)), the number of shares available for customer purchase (BSZ(STK)), and the number of shares acceptable for customer sales (SSZ(STK)). After input of the requested parameters (or initializing to default values), any orders previously stored in memory are reprocessed (block 190) as these orders may now be qualified for execution due to the change in price or other parameters. After stored orders are reviewed and executed if possible, data processing is restored to automatic mode (block 192)—as by simply setting a variable AUTØ to a predetermined state (e.g., "AUTØ"), and interrupt mode is exited at node 194. If at block 184 it is determined that the insider market price was not changed by the new market maker quotation, program flow branches directly to block 192 to restore automatic mode and exit interrupt mode.

The market making system of the above-described invention has thus been shown to automatically accommodate a random, real time order flow for security purchases or sales. Incoming orders are first examined to assure that they satisfy currently operative criteria regarding securities price, stock availability and stock order size. Those orders being qualified under the existing criteria are executed and profit and inventory price internal management storage elements are appropriately updated to reflect the several transactions experienced by the system. Orders not qualified for execution are stored and re-examined from time to time for possible later executability. The system proceeds automatically without human intervention, save to update operative market maker order qualification criteria.

The above-described arrangement is merely illustrative of the principles of the present invention. Numerous modifications and adaptations thereof will be readily apparent to those skilled in the art without departing from the spirit and scope of the present invention.

What is claimed is:

1. A data processing system for making a trading market in at least one security in which the system proprietor is acting, as a principal; said system including means for receiving trade orders for said at least one security from system customers, said trade orders including fields identifying the stock to traded and characterization of the trade as customer purchase or sale, and the number of shares for the transaction; means for retrieving and for storing operative bid and asked prices for said at least one security; means for entering and for storing order qualification parameters, said parameters and said stored prices determining which received orders are qualified for execution; means for storing data characterizing position, cost and profit for said at least one security; qualifying means responsive to said received trade offers and said stored prices and order qualification parameters for qualifying a trade order for execution when the received trade order fields do not violate the stored prices and qualification parameters; means for executing each trade order qualified by said qualification means; and post-execution updating means for incrementing said stored position in said at least one security by the amount of a trade order upon execution of a customer sale and decrementing said stored position by the amount of a trade order upon execution of a customer purchase and means for updating at least one of said stored cost and profit upon execution of a trade.

2. A system as in claim 1, further including means for storing said trade order without execution if said trade order is not within said qualification parameters.

3. A system as in claim 1, wherein said stored order qualifying parameters include the amount of said at least one security available for customer purchase and the amount of said at least one security available for customer sale, said data processing system further including means for decrementing said amount of said security available for customer purchase by the amount of said security in a trade order upon execution of a customer purchase, and means for decrementing said amount of said security available for customer sales by the amount of said security in a trade order upon execution of a customer sale.

4. A system as in claim 3, wherein said stored order qualifying parameters include a maximum amount of said at least one security acceptable in a single customer trade order.

5. A system as claimed in claim 1, wherein said trade orders further include data characterizing the order as being executable at market or within price stated price limit bounds, said data processing system further including means for comparing said predetermined price limit bounds with said stored operative bid and asked prices to determine if said trade is executable.

6. A system as in claim 1, wherein said market making data processing system includes means for storing the last position for said at least one security, and means for calculating profit in an executed transaction which algebraically reduces toward or beyond zero on the number line, said position relative to said stored last position.

7. A system as in claim 1, wherein said post-execution updating means includes means for updating said average per share cost of the stocks in said position.

8. A system as in claim 1, further including interrupt means for halting data processing upon retrieval of a changed bid or asked price, said data processing system further including means for updating said bid and asked prices upon receipt of a new operative bid or asked price for said at least one security, interactive means for manual entry of updated order qualification parameters, and means for reprocessing said unexecuted stored trades.

9. A system as in claim 1, further including means for communicating data regarding executed trades to further data processing apparatus.

10. A system as in claim 1, wherein said means for receiving trade orders includes both related and unrelated, third party order origination means, and network means interconnecting said order origination means with said market making data processing system.

* * * * *